G. L. KAVANAGH.
PROCESS OF AND APPARATUS FOR MAKING VEHICLE TIRES.
APPLICATION FILED JULY 25, 1914.
1,271,579.
Patented July 9, 1918
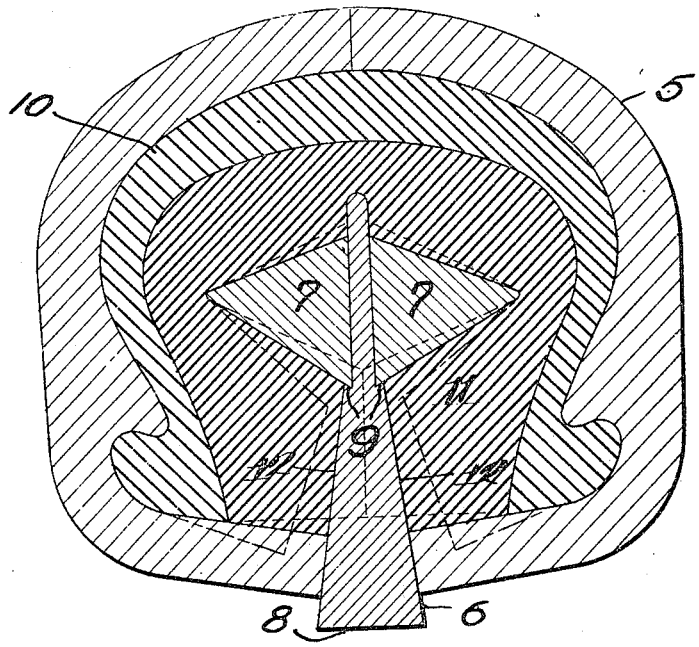
FIG. 1.
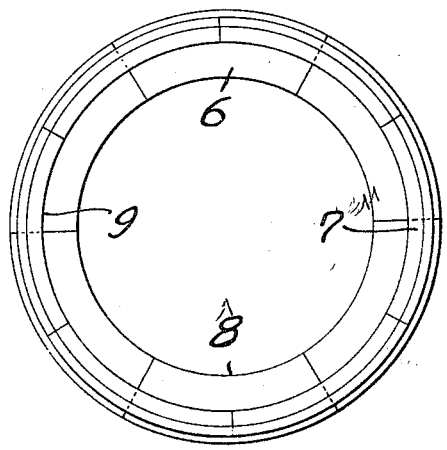
FIG. 2.
Witnesses
Inventor
G. L. Kavanagh
By
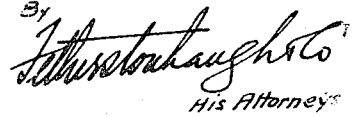
His Attorneys

UNITED STATES PATENT OFFICE.

GEORGE LENNON KAVANAGH, OF MONTREAL, QUEBEC, CANADA.

PROCESS OF AND APPARATUS FOR MAKING VEHICLE-TIRES.

1,271,579.

Specification of Letters Patent.  Patented July 9, 1918.

Application filed July 25, 1914. Serial No. 853,145.

*To all whom it may concern:*

Be it known that I, GEORGE LENNON KAVANAGH, a citizen of the Dominion of Canada, and resident of the city of Montreal, in the Province of Quebec and Dominion of Canada, have invented certain new and useful Improvements in Processes of and Apparatus for Making Vehicle-Tires, of which the following is a full, clear, and exact description.

This invention relates to improvements in process of and apparatus for making vehicle tires, and the object is to provide a simple and expeditious method of making the improved tire described and claimed in my co-pending application, Ser. No. 853,144.

The invention consists essentially in molding within a suitable outer casing a filling of comparatively soft elastic material and vulcanizing same in such form that an annular passage of suitable form will be left in the approximate center of the filling.

In the drawings which illustrate the invention:—

Figure 1 is a cross sectional view of the vulcanizer molds with tire therein.

Fig. 2 is a plan view of the core rings.

Referring more particularly to the drawings, 5 designates a mold, 6 a central core ring formed of a plurality of arcuate pieces, and 7 lateral core rings, also formed of a plurality of arcuate pieces. The mold may be of any usual form suitable for the work. The central core ring 6 is very slightly triangular in cross section, and is held at the base 8 or narrowest side of the triangle in the mold. Toward the apex this central core ring is shouldered, as shown at 9, to provide a seat for the lateral core rings 7. In the process of manufacture, a tire shoe 10 of any suitable type is placed in the mold 5 and the central and lateral core rings inserted within the shoe, and arranged concentric therewith. The space between the inner wall of the shoe and the core ring is then filled with rubber or other suitable material of proper consistency and vulcanized, so as to become practically integral with the shoe and form a filling 11 of material softer and more elastic than the shoe. After the vulcanizing process is complete, the mold is opened and the central core ring withdrawn, the surfaces 12 of the filling adjacent the sides of the central core ring are then spread sufficiently apart, and the lateral core rings 7 withdrawn, piece by piece. The taper of the central core ring is such that when the edges of the tire are pressed together, the surfaces 12 of the filling will bear against one another, so as to close the opening through which the core ring was inserted and leave an annular channel in the filling. This annular channel retains the shape of the lateral core rings 7, and is either truly elliptic or diamond shaped, according to the shape of the core ring. This shape may, however, be spoken of in general terms as approximately elliptic. It is essential that the core be located exactly concentric with the tire, as otherwise the walls surrounding the annular passage formed by the core will not be of uniform thickness and the tire will have greater resistance at some points than at others. In filling the casing, it is necessary to select material which when vulcanized will be softer, more resilient and more elastic than the material of the casing, and yet of sufficient strength to withstand considerable and continued distortion without tearing, crumbling or otherwise deteriorating.

Having thus described my invention, what I claim is:—

1. A process of making tires, which consists in inserting a casing within a mold, positioning a multi-part core concentrically within said casing, filling the space between the casing and core with suitable material, and vulcanizing until the filling is rigidly attached to the casing and is of softer and more elastic consistency than the casing.

2. A process of making tires, which consists in vulcanizing a filling of soft elastic material within an outer casing and around a core, withdrawing the core and contracting the tire to form an annular passage of symmetrical cross section.

3. A process of molding hollow annular rubber articles such as tires, which consists in inserting a circular multipart core having a projecting key portion within a mold, filling the space between the mold and core with material and vulcanizing, removing the key portion of the core and subsequently removing the core part by part through the passage molded by the projecting key portion, and finally forming the article by contracting to close the passage molded by the projecting key portion.

4. An apparatus for making tires, comprising the combination of a sectional circular core member approximately triangular in cross section, a shoulder adjacent the outer edge thereof, and a pair of circular sectional wings of suitable cross section adapted to be inclosed by the tire carried by the first ring and forming part of the core and bearing against the shoulder thereof.

5. An apparatus for making tires, comprising the combination with a mold of a central sectional circular core member approximately triangular in cross section, a pair of similar sectional circular core members carried by said central member forming a part of the core and of such cross sectional shape that when the article molded around the core is contracted bringing the surfaces molded by the central core member into engagement, the surfaces molded by the second core members will form walls of a symmetrical annular channel.

6. An apparatus for molding hollow annular rubber articles, comprising the combination with a mold of a circular sectional core member composed of a central sectional portion, and sectional laterally projecting portions carried by and removable from the central portion while in the molded article.

In witness whereof, I have hereunto set my hand, in the presence of two witnesses.

GEORGE LENNON KAVANAGH.

Witnesses:
   S. R. W. ALLEN,
   G. M. MORELAND.